(12) United States Patent
Jouet et al.

(10) Patent No.: US 9,216,348 B2
(45) Date of Patent: Dec. 22, 2015

(54) DEVICE TO CONTROL THE MOVEMENT OF A VIRTUAL PLAYER AND A VIRTUAL BALL IN A GAME APPLICATION

(75) Inventors: Pierrick Jouet, Cesson Sevigne (FR); Pascal Bourdon, Cesson Sevigne (FR); Vincent Alleaume, Cesson Sevigne (FR)

(73) Assignee: Thomson Licensing, Boulogne, Billancourt (FR)

( * ) Notice: Subject to any disclaimer, the term of this patent is extended or adjusted under 35 U.S.C. 154(b) by 220 days.

(21) Appl. No.: 13/440,719

(22) Filed: Apr. 5, 2012

(65) Prior Publication Data

US 2012/0258799 A1 Oct. 11, 2012

(30) Foreign Application Priority Data

Apr. 8, 2011 (FR) ...................................... 11 53085

(51) Int. Cl.
*A63F 13/812* (2014.01)
*A63F 13/20* (2014.01)
(Continued)

(52) U.S. Cl.
CPC .............. *A63F 13/06* (2013.01); *A63F 13/218* (2014.09); *A63F 13/23* (2014.09); *A63F 13/428* (2014.09); *A63F 13/812* (2014.09); *A63F 2300/105* (2013.01); *A63F 2300/1056* (2013.01); *A63F 2300/1062* (2013.01); *A63F 2300/301* (2013.01);
(Continued)

(58) Field of Classification Search
CPC .............. A63F 13/06; A63F 2300/105; A63F 2300/1037; A63F 1/005; A63F 13/23; A63F 13/245; A63F 13/285; A63F 13/812; A63F 13/214; A63F 13/218; A63F 13/40; A63F 13/428

USPC .................................... 463/2, 4, 7, 36, 39, 30
See application file for complete search history.

(56) References Cited

U.S. PATENT DOCUMENTS

| 6,149,520 A | 11/2000 | Takatsuka |
| 2006/0128489 A1 | 6/2006 | Mooney et al. |

(Continued)

FOREIGN PATENT DOCUMENTS

| CH | 681428 | 3/1993 |
| DE | 10107797 | 8/2002 |

(Continued)

OTHER PUBLICATIONS

Kick It Jr. aracade video game, http://www.primetimeamusements.com/arcadegame.php?id=31, released in 1997.*

(Continued)

*Primary Examiner* — Damon Pierce
(74) *Attorney, Agent, or Firm* — Jeffrey D. Carter

(57) ABSTRACT

The present invention relates to the domain of control devices for virtual games, and more specifically to a control device to control the displacement of a virtual player and of a virtual ball in the scope of a football video game. According to the invention, the control device is in the form of a ball connected to a pedestal. This ball is equipped with accelerometers able to detect a displacement force on the ball as a result of a strike exerted on said ball, pressure sensors able to detect a pressure force exerted on the surface of the ball and a processing module. The processor module generates using information from the accelerometers and pressure sensors control signals to control the displacement of the virtual ball in the video game and control signals to control the displacement of the virtual player in the video game.

14 Claims, 2 Drawing Sheets

(51) Int. Cl.
*A63F 13/23* (2014.01)
*A63F 13/428* (2014.01)
*A63F 13/218* (2014.01)

(52) U.S. Cl.
CPC . *A63F 2300/6045* (2013.01); *A63F 2300/8011* (2013.01)

(56) References Cited

U.S. PATENT DOCUMENTS

| | | | |
|---|---|---|---|
| 2006/0281507 A1* | 12/2006 | Adams | 463/6 |
| 2007/0091084 A1 | 4/2007 | Ueshima et al. | |
| 2007/0191083 A1* | 8/2007 | Kuenzler et al. | 463/7 |
| 2008/0286733 A1* | 11/2008 | Claudel et al. | 434/251 |
| 2010/0004061 A1* | 1/2010 | Merril et al. | 463/36 |
| 2010/0304867 A1* | 12/2010 | Nicolas et al. | 463/37 |
| 2011/0269517 A1* | 11/2011 | Englert et al. | 463/7 |
| 2012/0262329 A1* | 10/2012 | Molyneux et al. | 342/42 |

FOREIGN PATENT DOCUMENTS

| | | |
|---|---|---|
| DE | 10338620 | 3/2005 |
| EP | 2090346 | 8/2009 |
| GB | 2440510 | 2/2008 |
| JP | 07227449 | 8/1995 |
| JP | 2004097662 | 4/2004 |
| WO | WO2007045785 | 4/2007 |

OTHER PUBLICATIONS

Kick It Pro Series arcade video game, http://www.primetimeamusements.com/arcadegame.php?id=26, released in 1997.*
WO 2002049731 to Sang an Cha, Dec. 18, 2000.*
https://www.youtube.com/watch?v=QDIIIpK8or0, FIFA 2000 Gameplay—YouTube video, Nov. 5, 2010.*
EA Sports, FIFA 2000, Major League Soccer, Playstation manual, 2000.*
French Search Report dated Sep. 2, 2011.

* cited by examiner

DEVICE TO CONTROL THE MOVEMENT OF A VIRTUAL PLAYER AND A VIRTUAL BALL IN A GAME APPLICATION

This application claims the benefit, under 35 U.S.C. §119 of FR Patent Application 1153085, filed on 8 Apr. 2011.

DOMAIN OF THE INVENTION

The present invention relates to the domain of control devices for virtual games, and more specifically to a control device to control the movement of a virtual player and of a virtual ball in the scope of a video game, such as a football video game.

PRIOR ART

For a few years now, the craze for video games has led actors of the sector to develop control devices (or interface devices) with a high level of interactivity and having great realism in the commands performed in playing the game.

Control devices specially adapted for the practice of football on a computer or video games console have been developed. For example the patent application WO 2007/045765 is known. It describes a control device to control the movement of a virtual ball, able to exchange signals with a computer or games console type digital processing unit. The device comprises a ball elastically linked to a pedestal having a form close to that of a football and that a player can kick with his foot. This ball is equipped with shock sensors or acceleration sensors to detect an impact on the ball. These sensors enable the location and intensity of the displacement force of the ball to be determined following a user kicking it. The signals generated by the sensors are transformed, via a specific processing module, into control signals intended for the game console to control the displacement of the virtual ball in the video game.

To control the displacement of the virtual player in the video game, a second control device, of joystick type, connected to the games console is used by the user. This latter is thus required to use two control devices connected to the console to play a game of football.

One purpose of the invention is to propose a single control device to control the displacement of the virtual ball and of the virtual player in the video game.

SUMMARY OF THE INVENTION

The purpose of the present invention is a control device to control the displacement of a virtual player and of a virtual ball in the scope of a video game, such as for example a football video game, said device being able to exchange signals with a digital processing unit, such as for example a personal computer or a games console, and comprising a ball connected to a pedestal, said ball being equipped with first sensors able to detect a displacement force of the ball following an impact exerted on said ball, and a to processing module able to generate, using information provided by said first sensors, first control signals intended for the digital processing unit to control the displacement of the virtual ball in the video game, characterized in that the ball is also equipped with second sensors able to detect a pressure force exerted on the surface of the ball, and in that said processing module is able to generate, from information provided by said second sensors, second signals intended for the digital processing unit to control the displacement of the virtual player in the video game.

Thus, according to the invention, the ball is used to move both the virtual player and the virtual ball in the video game. There is no need for an additional control device such as a joystick, to control the movement of the player in the video game.

Advantageously, the processing module is also able to receive a third control signal from the digital processing unit indicating if the virtual ball is present in a predetermined zone around the virtual player and the ball is equipped on its surface with a first light source able to transmit a light signal when the processing module receives said third control signal.

When the virtual ball is present in the predetermined zone, the light signal indicates to the user that the virtual player is in striking position. The predetermined zone is for example a circle of predetermined radius centred on the virtual player or a portion of this circle, for example the half-circle placed in front of the virtual player.

According to a preferred embodiment, the surface of the ball is divided into at least four sectors each fitted with a pressure sensor, said pressure sensors forming said second sensors, each sector being associated with a displacement direction of the virtual player in the video game so that a pressure exerted on one of said sectors of the ball provokes the displacement of the virtual player in the associated direction.

Advantageously each sector is equipped with a light source able to transmit a light signal when a pressure has been exerted on said sector.

According to a particular embodiment, said light sources arranged in the sectors form said first light source. Thus, when the processing module receives the third control signal all the light sources of sectors of the ball light-up to inform the user that the virtual player is in strike position. The light sources are for example light emissive diodes.

According to a particular embodiment, the first sensors comprise accelerometers and/or gyroscopes arranged close to the centre of the ball and said second sensors are pressure sensors arranged on the surface of the ball.

BRIEF DESCRIPTION OF THE FIGURES

The invention will be better understood, and other aims, details, characteristics and advantages will appear more clearly over the course of the detailed description which follows in referring to the figures in the appendix, showing.

DETAILED DESCRIPTION OF AN EMBODIMENT

Figure 1:
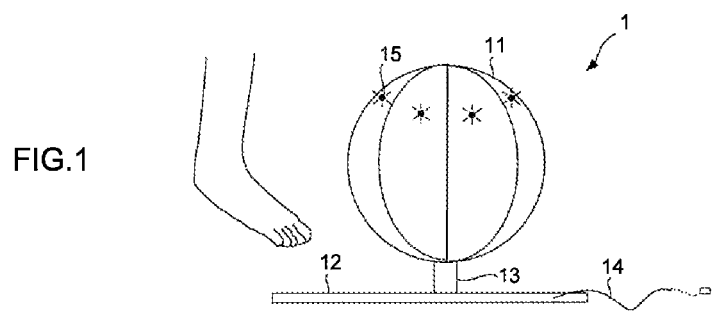
FIG. 1 shows a front view of a control device in accordance with the invention.
Figure 2:
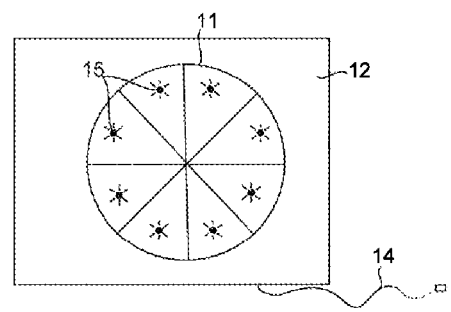
FIG. 2 shows a top view of the device in FIG. 1.

In reference to FIGS. 1 and 2, the control device 1 of the invention comprises a ball 11, of noticeably spherical form, elastically connected to a pedestal 12 via an appropriate semi-rigid elastic connection piece 13 that a user can strike with his foot. The purpose of the elasticity of the connection piece is to absorb the shocks due to strikes impacting the ball. In striking position, the supporting foot of the user rests on the pedestal that itself is on the ground. A cable 14 fitted with a connector is planned to connect the control device to a games console or personal computer.

The control device serves to move the virtual ball when this latter is close to the virtual player and to move the virtual player in the game in the other cases. More precisely, when the virtual ball is close to the virtual player, the ball is a control means enabling the virtual player to strike the virtual ball. The user strikes the ball 11 to execute this command. When the virtual ball is not close to the virtual player, the ball is a control means enabling the user to move the virtual player in the game. The user touches or presses the ball 11 with his foot to execute this command.

To control the movement of the virtual ball, the ball 11 is fitted with sensors that are sensitive to the acceleration enabling the movement of the ball to be characterized following a strike. It is for example equipped with a gyroscope and/or accelerometers arranged at its centre or close to it. The signals from these sensors will serve to define the trajectory of the virtual ball in the game.

The ball is also fitted with pressure sensors arranged on its surface to characterize the foot-ball contacts. Signals from these sensors are used to control the movement of the virtual player in the game. The surface of the ball is divided into sectors, preferably of noticeably equal size. Each of these sectors is associated with a movement direction of the virtual player and is fitted with a pressure sensor to detect a pressure or contact with the foot on this sector. To move the virtual player in a given direction, the user must touch with his foot the sector associated with this movement direction.

So that the user knows if the virtual player can or cannot strike the ball (virtual ball close to the virtual player or not), the ball is advantageously equipped with a light source 15 arranged on the surface. This light source lights-up when the virtual player is in a strike position (virtual ball close to the virtual player). In the embodiment shown by FIGS. 1 and 2, each sector of the ball is fitted with a light source 15. All of these light sources are lit when the virtual player is in strike position. The light sources are for example light emissive diodes.

According to an advantageous embodiment, these light sources also serve to indicate to the user the movement direction of the virtual player in the game when the player is no longer in strike position. To do this, the light source of the sector that was last touched by the foot of the user is lit.

Figure 3:
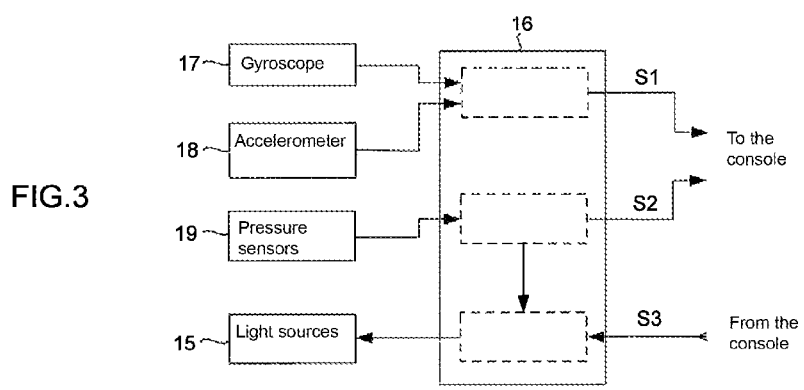
FIG. 3 is a diagram showing the sensors and the processing module of the device of FIG. 1 and the signals exchanged with the games console connected to the control device.

As shown schematically in FIG. 3, all the signals from sensors are transformed by a processing module 16 arranged inside the ball or on the pedestal before being transmitted to the games console via a cable or a wireless transmission means. The processing module 16 also receives signals from the console for the lighting of light sources when the virtual player is in strike position.

In reference to FIG. 3, the processing module 16 is able to to generate control signals S1 from information coming from the gyroscope 17 and the accelerometers 18. The control signals S1 enable the trajectory of the virtual ball to be controlled in the game. When the user strikes the ball, the acceleration of the ball is determined by the accelerometer(s). The acceleration vector generated by these latter elements at the instant of the strike in the ball enables the amplitude and angle of the trajectory of the virtual ball to be determined. Signals generated by the gyroscope serve to refine the angle of the trajectory of the virtual ball. The processing module 16 transforms this information from the gyroscope and accelerometers into control signals S1 intended for the console to control the movement of the virtual ball.

The processor module 16 also transforms the signals from pressure sensors 19 into control signals S2 intended to control the movement of the virtual player. When the foot of the user is in contact with a sector of the ball, the pressure sensor of this sector detects the contact and the processor module then transforms this information into a control signal S2 indicating to the console that the user wants to move the virtual player in the movement direction associated with said sector.

The processor module 16 also receives from the console a control signal S3 when the virtual ball is close to the virtual player that is to say when this latter is in strike position. The control signal S3 is for example transmitted to the processor module when the virtual ball is in a circle centred on the virtual player and predetermined radius, for example 0.5 meters. In an improved embodiment, this zone is advantageously reduced to half the circle placed in front to the virtual player. The reception of the control signal S3 by the processor module controls the lighting-up of the set of light sources 15. Likewise, pressure on a sector of the ball triggers, via the processor module 16, the lighting of the light source of said sector.

According to a particular embodiment, the reception of the control signal S3 blocks or deactivates the generation of control signals S2 by the processing module. Only the generation of control signals S1 is allowed in the processor module, said signals are transmitted to the console. Thus when the virtual player is in strike position, only the control signals S1 are transmitted to the console.

If we take the set of characteristics presented above, the functioning of the control device of the invention is as follows. When the virtual ball is present in a predetermined zone close to the virtual player, a control signal S3 is transmitted to the processing module that triggers the lighting of light sources. The user then knows the virtual player is in strike position. The virtual player can then strike the ball to shoot at goal or pass to a team-mate. When the user strikes the ball, the accelerometers and the gyroscope detect the strike and transmit information on the movement of the ball to the processing module that transforms the information into control signals S1 intended for the console. While the virtual ball is close to the virtual player in the predefined zone, the information from the pressure sensors is not taken into account by the processing module. When the virtual ball leaves the predetermined zone, the processing module ceases to receive the control signal S3 and the light sources turn off.

When the virtual ball is outside the predetermined zone, the virtual player is no longer in strike position but he can move over the playing surface. To do this, the user touches with his foot the sector of the ball corresponding to the movement direction that he wants to give to the virtual player. He can also touch two adjacent sectors at the same time to move the virtual player in a direction that is the median of the direction associated with these two sectors. The light source corresponding to the sector or to the two sectors last touched light up to signify to the user that the foot to ball contact was indeed detected and that the virtual player is currently moving in this direction. Moreover, the user regulates the speed or time in movement of the virtual player by exerting more or less pressure on the ball. The amplitude of the pressure is thus used to define the speed or time in movement of the virtual player.

Figure 4:
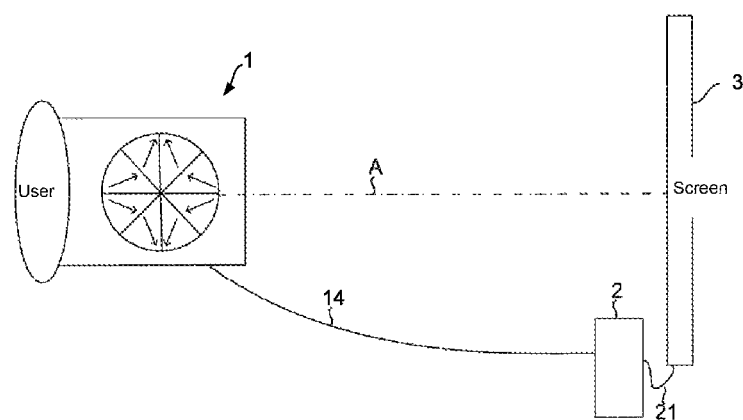
FIG. 4 shows a top view of a system comprising the control device of the invention, a games console and a screen.

FIG. 4 shows a diagrammatical top view of a system comprising a control device 1 in accordance with the invention connected via the cable 14 to a console 2, itself connected to a screen 3 via a cable 21. The pedestal of the control device is placed in front to the screen, at a certain distance, in such a way that the longitudinal axis A is noticeably perpendicular to the front side of the screen. The user places himself behind the control device with respect to the screen but close to it to be able to strike or touch the ball. In this figure, the surface of the ball is divided into 8 sectors each associated with a movement direction of the virtual player. The arrows figuring in the different sectors indicate the movement directions. A contact on one of these sectors enables the user to move the player in the direction indicated by the arrow.

Figure 5:
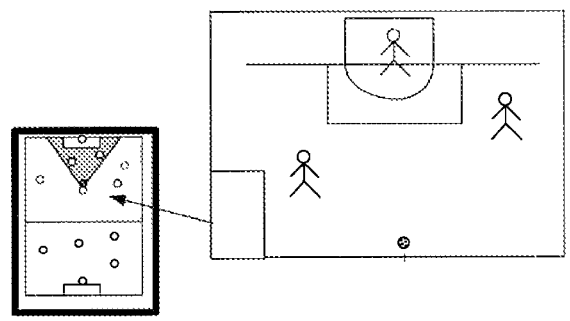
FIG. 5 shows an example of the view displayed on the screen while the game is playing.

The screen 3 preferably displays two viewpoints to inform the user on the positioning of the virtual player and of the virtual ball on the playing surface and to show him the field of vision of the virtual player. These two view points are shown in FIG. 5. The field of vision of the virtual player is displayed in full screen and a plan of the positioning of players on the field is displayed in a window placed in the lower left corner of the screen.

The use of this display allied to the control device proposed here enables a very high level of immersion of the user in the game. Moreover, the user needs only a single control device to control the movement of the virtual ball and the virtual player.

Though the invention has been described in relation to a specific embodiment, it is evident that this is in no way restricted and that it comprises all technical equivalents of the means described as well as their combinations if these enter into the scope of the invention. Many variants are possible. The control device is for example adapted for controlling the movement of a virtual player and of a virtual ball for any type of video game, for example a football video game, a rugby video game, a hockey video game, a tennis video game, the ball connected to the pedestal corresponding to any type of ball, such as a ball for playing football, a ball for playing rugby, a puck for playing hockey or a ball for playing tennis.

In a variant, the control device may comprise only accelerometers to generate control signals S1. The number and disposition of sectors of the ball can be different. A light source distinct from the light sources 15 can be envisaged to indicate that the virtual ball is close to the player.

The invention claimed is:

1. A device to control a displacement of a virtual player and a displacement of a virtual ball in a video game, said device operative to exchange signals with a digital processing unit and said device comprising a structure in a shape of a ball, wherein:
    said structure comprises first sensors operative to detect a displacement force on said structure following a strike exerted on said structure, and wherein said device comprises a processing module operative to generate, using information provided by said first sensors, first signals for said digital processing unit to control said displacement of said virtual ball in said video game;
    said structure further comprises second sensors operative to detect a pressure force exerted on said structure; and
    said processing module is operative to generate, from information provided by said second sensors, second signals for said digital processing unit to control said displacement of said virtual player in said video game.

2. The device according to claim 1, wherein said processing module is operative to receive a third signal from said digital processing unit indicating if said virtual ball is present in a determined zone around said virtual player, and wherein said structure comprises a first light source operative to provide a light signal when said processing module receives said third control signal.

3. The device according to claim 2, wherein said predetermined zone is a circle of determined radius centered on said virtual player.

4. The device according to claim 2, wherein said predetermined zone is a portion of a circle of determined radius centered on said virtual player.

5. The device according to claim 2, wherein said structure has a surface divided into at least four sectors each monitored by a pressure sensor, said pressure sensors forming said second sensors, each said sector being associated with a displacement direction of said virtual player in said video game so that a pressure exerted on one of said sectors of said structure provokes said displacement of said virtual player in an associated direction.

6. The device according to claim 5, wherein each said sector is equipped with a light source operative to provide a light signal when a pressure has been exerted on said sector.

7. The device according to claim 6, wherein said light sources of sectors form said first light source.

8. The device according to claim 1, wherein said first sensors comprise at least one accelerometer located close to a center of said structure.

9. The device according to claim 8, wherein said first sensors also comprise a gyroscope located close to said center of said structure.

10. A method of controlling a displacement of a virtual player and a displacement of a virtual ball in a video game, said method being implemented in a device operative to exchange signals with a digital processing unit and said device comprising a structure in a shape of a ball, wherein said method comprises:
    detecting, by first sensors, a displacement force on said structure following a strike exerted on said structure;
    generating, using information provided by said first sensors, first control signals for said digital processing unit to control said displacement of said virtual ball in said video game;
    detecting a pressure force exerted on said structure; and
    generating, in response to said detected pressure force, second signals for said digital processing unit to control said displacement of said virtual player in said video game.

11. The method according to claim 10, further comprising receiving a third control signal from said digital processing unit indicating if said virtual ball is present in a determined zone around said virtual player, and providing a light signal when receiving said third signal.

12. The method according to claim 11, wherein said predetermined zone is a circle of determined radius centered on said virtual player.

13. The method according to claim 11, wherein said predetermined zone is a portion of a circle of determined radius centered on said virtual player.

14. The method according to claim 10, wherein said structure is kicked by a user.

* * * * *